(12) United States Patent
Liu (10) Patent No.: US 11,894,978 B1
(45) Date of Patent: Feb. 6, 2024

(54) COMPUTING POWER SCHEDULING METHODS, APPARATUS, ELECTRONIC DEVICES AND STORAGE MEDIA

(71) Applicant: Beijing University of Posts and Telecommunications, Beijing (CN)

(72) Inventor: Yang Liu, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 18/358,050

(22) Filed: Jul. 25, 2023

(30) Foreign Application Priority Data

Nov. 4, 2022 (CN) .......................... 202211372834.6

(51) Int. Cl.
| | |
|---|---|
| *H04L 41/12* | (2022.01) |
| *H04L 41/0893* | (2022.01) |
| *G06F 1/3209* | (2019.01) |
| *H04L 43/0876* | (2022.01) |
| *H04L 41/0895* | (2022.01) |

(Continued)

(52) U.S. Cl.
CPC ........ *H04L 41/0893* (2013.01); *G06F 1/3209* (2013.01); *H04L 41/12* (2013.01); *H04L 41/0895* (2022.05); *H04L 41/122* (2022.05); *H04L 41/40* (2022.05); *H04L 43/0876* (2013.01); *H04L 45/12* (2013.01)

(58) Field of Classification Search
CPC ..... H04L 41/12; H04L 41/40; H04L 41/0893; H04L 41/0895; H04L 41/122; H04L 45/12; H04L 43/0876; H04L 43/20
See application file for complete search history.

(56) References Cited

U.S. PATENT DOCUMENTS

2014/0089506 A1* 3/2014 Puttaswamy Naga .. H04L 47/80
709/225
2016/0134527 A1* 5/2016 Kwak ..................... H04L 45/02
370/352

(Continued)

FOREIGN PATENT DOCUMENTS

CN 104796269 A * 7/2015 ......... H04L 12/6418
CN 104734878 B * 3/2018 ......... H04L 41/0668

(Continued)

*Primary Examiner* — Tom Y Chang (57) ABSTRACT

The present invention provides a computing power scheduling method, apparatus, electronic devices and storage medium, the method comprising: a computing power node and an access terminal send computing power information to a switch using L4 network protocol; the switch uploads the computing power information to a distributed SDN subcontroller; the distributed SDN subcontroller collects switch state information and network quality information from the switch using in-band network telemetry technology; the distributed SDN sub-controller collects switch state information and network quality information from the switch using in-band network telemetry; the distributed SDN sub-controller uploads the computing power information, switch state information and network quality information to the SDN master controller; the SDN master controller determines the computing power scheduling policy based on the computing power information, switch state information, network quality information and master controller information of the SDN master controller.

4 Claims, 3 Drawing Sheets

(51) Int. Cl.
  *H04L 41/122* (2022.01)
  *H04L 41/40* (2022.01)
  *H04L 45/12* (2022.01)

(56) References Cited

U.S. PATENT DOCUMENTS

| | | | |
|---|---|---|---|
| 2017/0085501 A1* | 3/2017 | Utgikar | H04L 47/20 |
| 2017/0237649 A1* | 8/2017 | Sampath | H04L 41/40 |
| | | | 370/238 |
| 2019/0097890 A1* | 3/2019 | Zhang | H04L 41/12 |
| 2023/0059537 A1* | 2/2023 | Gavand | H04L 43/16 |
| 2023/0216736 A1* | 7/2023 | Almadani | H04L 41/122 |
| | | | 709/224 |

FOREIGN PATENT DOCUMENTS

| | | | | |
|---|---|---|---|---|
| CN | 105610615 B | * | 12/2018 | H04L 41/12 |
| CN | 113810205 A | | 12/2021 | |
| CN | 115733791 A | * | 3/2023 | H04L 45/02 |

* cited by examiner

COMPUTING POWER SCHEDULING METHODS, APPARATUS, ELECTRONIC DEVICES AND STORAGE MEDIA

TECHNICAL FIELD

The present invention relates to the technical field of computing power networks and, in particular, to a computing power scheduling method, apparatus, electronic devices and storage medium.

BACKGROUND

With the gradual rise of cloud computing, big data and artificial intelligence, data centers have become an important infrastructure for digital transformation, and data centers are increasingly deployed for a wide range of applications. With the massive increase in computing demand of each application, local computing resources can hardly meet the demand, and more end users need to choose computing power nodes to provide computing power resources for them. At the same time, the functionality and complexity of service business increase, requiring more collaboration and interconnection between computing power nodes. Therefore, it is especially important to collect computing power information and carry out computing power scheduling in a reasonable and efficient manner.

In the existing technical solutions, the extended and enhanced BGP protocol (Border Gateway Protocol) is used to complete the announcement of computing power resource information, however, a large number of BGP announcements will consume a large amount of network topology resources, and also cause serious consequences such as network wide fluctuations and routing oscillations. The use of a single SDN (Software Defined Network) controller not only needs to control the switch and collect computing power information from many computing power nodes and access terminals, but also needs to collect network information and formulate computing power scheduling policies, which seriously reduces computing power scheduling efficiency.

SUMMARY

The present invention provides a computing power scheduling method, apparatus, electronic device and storage medium for solving the defects of low computing power scheduling efficiency in the prior art and realizing efficient computing power scheduling.

The present invention provides a method for scheduling computing power, including:
the computing power nodes and access terminals send computing power information to the switch using L4 network protocol; where L4 network protocol is based on UDP protocol and decoupled from BGP protocol;
the switch uploads computing power information to the distributed SDN sub-controller;
distributed SDN subcontrollers collect switch status information and network quality information from switches using in-band network telemetry;
distributed SDN sub-controller uploads computing power information, switch status information and network quality information to the SDN master controller;
the SDN master controller determines the computing power scheduling policy based on the computing power information, switch status information, network quality information and the master controller information of the SDN master controller.

A computing power scheduling method according to the present invention, wherein the computing power information includes resource information and request information;
the computing power nodes and access terminals use L4 network protocol to send computing power information directed to the switch, including:
computing power nodes send resource information to the switch using L4 network protocol;
the access terminal sends request messages to the switch using L4 network protocol.

According to a method of computing power scheduling provided by the present invention, an SDN master controller determines a computing power scheduling policy based on computing power information, switch state information, network quality information, and master controller information of the SDN master controller, including:
the SDN master controller identifies alternative computing power nodes among the computing power nodes based on resource information and request information;
the SDN master controller determines the alternative optimal routing path for access terminal access to the alternative computing power node based on the switch state information, network quality information and the master controller information of the SDN master controller;
the SDN master controller determines the target routing path of the access terminal to access the target computing power node among the alternative optimal routing paths of the access terminal to access the alternative computing power nodes according to the preset rules.

A computing power scheduling method according to the present invention, wherein the master controller information includes network topology information and network link information;
switch status information includes port utilization and port processing rate;
network quality information includes packet loss rate and packet queue length.

According to a computing power scheduling method provided by the present invention, an SDN master controller determines an alternative optimal routing path for an access terminal to access an alternative computing power node based on switch state information, network quality information, and master controller information of the SDN master controller, including:
the SDN master controller determines the first alternative routing path for the access terminal to the alternative computing power node based on the network topology information;
the SDN host controller filters the first alternative routing path based on the network link information to determine the second alternative routing path;
the SDN master controller filters the second alternative routing path based on port utilization, port processing rate, packet loss rate, and packet queue length to determine the alternative optimal routing path.

A computing power scheduling method according to the present invention, wherein the switch uploads computing power information to a connected distributed SDN sub-controller, including:
the switch determines the amount of load based on computing power information;

the switch determines the control time of the first SDN subcontroller and the second SDN subcontroller based on the load volume;

the switch sends the computing power information to the first SDN subcontroller and the second SDN subcontroller in segments according to the control time.

The invention also provides a computing power scheduling device including:

information module for controlling computing power nodes and access terminals to send computing power information to the switch using L4 network protocol, wherein L4 network protocol is based on UDP protocol and decoupled from BGP protocol; controlling the switch to upload computing power information to the distributed SDN sub-controller; controlling the distributed SDN sub-controller to collect switch status information and network quality information from the switch using in-band network telemetry techniques, and uploading computing power power information, switch state information and network quality information to the SDN master controller;

scheduling module for controlling the SDN master controller to determine the computing power scheduling policy based on the computing power information, the switch state information, the network quality information, and the master controller information of the SDN master controller.

The invention also provides an electronic device including a memory, a processor and a computer program stored in the memory and runnable on the processor, the processor executing the program to implement the steps as described above for any of the computing power scheduling methods.

The present invention also provides a non-transitory computer readable storage medium on which a computer program is stored, which computer program when executed by a processor implements the steps of the computing power scheduling method as described above in any of the above.

The present invention also provides a computer program product including a computer program, the computer program being executed by a processor to implement steps as described above for any of the computing power scheduling methods.

The present invention provides computing power scheduling method, apparatus, electronic devices and storage medium, in which the computing power nodes and access terminals use L4 network protocol decoupled from BGP protocol to make directed announcements of computing power information to the switch, reducing the network fluctuations and topology resource consumption generated by BGP protocol announcements under the conditions of computing power information changes. Combined with the in-band network telemetry technology to collect switch status information and network quality information, it reduces the chance of network failure or congestion during the computing power scheduling process. The distributed SDN sub-controller receives the computing power information, switch status information and network quality information from the switch and sends them to the SDN master controller, which formulates the computing power scheduling policy based on the computing power information, switch status information, network quality information and its own master controller information, effectively improving the computing power scheduling efficiency.

BRIEF DESCRIPTION OF DRAWINGS

In order to more clearly illustrate the invention or the technical solutions in the prior art, the following is a brief description of the drawings required to be used in the description of the embodiments or prior art, and it will be apparent that the drawings in the following description are some embodiments of the invention, and that other drawings may be obtained on the basis of these drawings without any creative effort on the part of a person of ordinary skill in the art.

DETAILED DESCRIPTION OF EMBODIMENTS

In order to make the purpose, technical solutions and advantages of the present invention clearer, the technical solutions in the present invention will be described clearly and completely below in conjunction with the accompanying drawings in the present invention, and it is clear that the described embodiments are a part of the embodiments of the present invention, and not all of them. Based on the embodiments in the present invention, all other embodiments obtained by a person of ordinary skill in the art without making creative labor fall within the scope of protection of the present invention.

To facilitate the understanding of the computing power scheduling method, apparatus, electronic devices and storage medium provided by the present invention, a brief description of what is involved in the present invention is given here.

Software-defined networking, or SDN networking, is a new network architecture that separates the network data plane from the control plane, where the data plane is only used by the switch to perform packet forwarding functions, while the control plane has full-domain network information and the control plane is programmable, allowing the SDN controller to deploy data forwarding rules to achieve flexible scheduling of network traffic. The SDN controller completes the network information synchronization and forwarding policy deployment with the switch by receiving Packet In messages and sending Packet Out messages. The data plane can also be programmable, which can unbundle the switch with specific network protocols and use programming language to describe any data plane packet processing logic and behavior, and the packets can be changed and forwarded by parsing and action matching, further increasing the flexibility of the network.

The carrier network is responsible for connecting each computing power node and access terminal, and each computing power node and access terminal belong to different autonomous domains, and the connection between different autonomous domains needs to use external gateway protocols, and BGP protocol is an external gateway protocol, which realizes the route control and preference between each computing power node and access terminal by using BGP protocol. These information changes usually in days, weeks or even months, while the resource information and request information of computing power are notified much more frequently than that, so using extended BGP protocol to notify computing power information is not a good technical solution.

Figure 1:
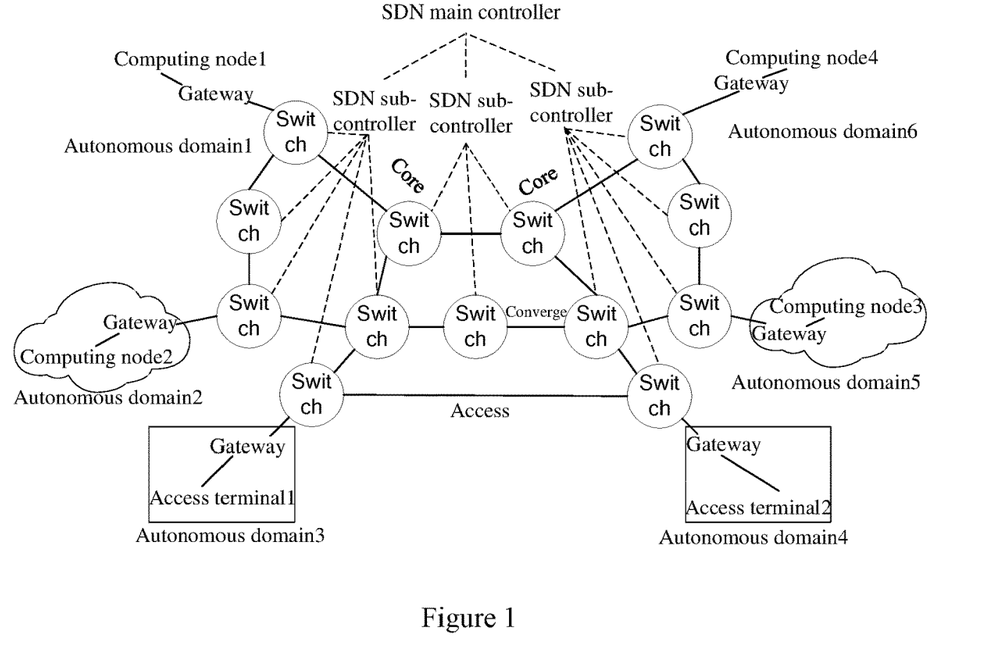
FIG. 1 is a schematic diagram of the structure of the computing power scheduling network architecture provided by the present invention.

As shown in FIG. 1, it shows a schematic structure of a computing power scheduling network architecture provided by the present invention.

The SDN controller adopts a hierarchical architecture, using multiple distributed SDN sub-controllers to control the switches in different areas, and an SDN master controller connected to each SDN sub-controller. A SDN master controller is connected to each SDN sub-controller. Each autonomous domain gateway and the bearer network switch establish connection through the intra-domain gateway BGP protocol, inform each other about the bearer network and the internal routing information of the autonomous domain, and use L4 network protocol to inform the switch directional resource information or request information, which is decoupled from BGP protocol.

Figure 2:
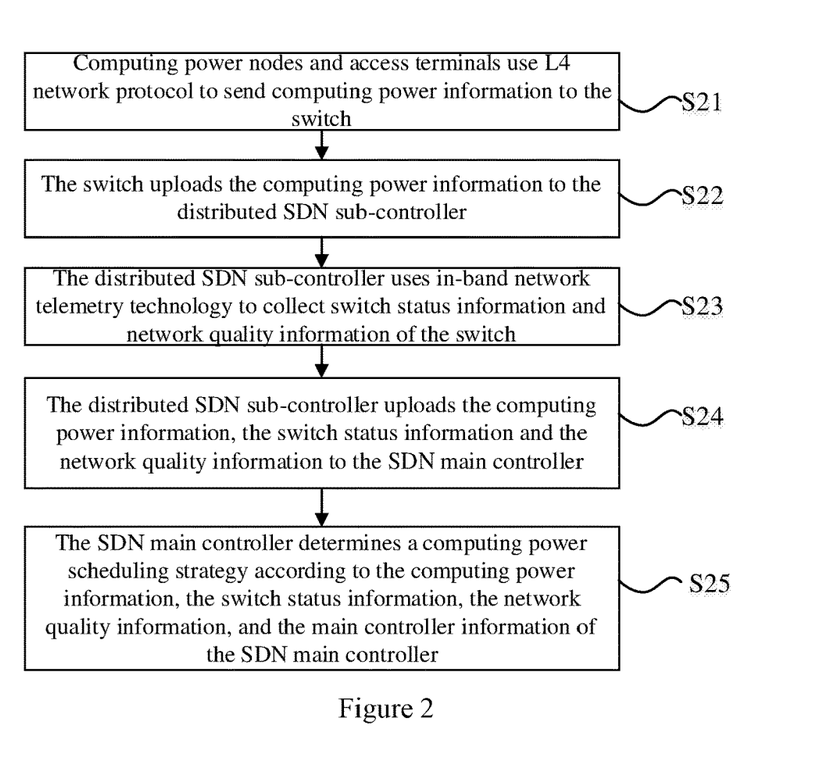
FIG. 2 is a schematic flow diagram of the computing power scheduling method provided by the present invention.

The present invention provides a computing power scheduling method, as shown in FIG. 2, including steps S21-S25.

S21, the computing power node and the access terminal send computing power information to the switch using L4 network protocol.

Among them, L4 network protocol is based on UDP protocol and decoupled from BGP protocol.

L4 network protocol uses UDP-based reliable transfer protocol for scenarios where computing power information needs to be sent to the bearer network switches via gateways within the autonomous domain. Optionally, the UDT protocol (UDP-based Data Transfer Protocol) can be used to transmit computing power information. The UDT protocol establishes connections based on handshake, keep alive, etc., using logical connection channels; it can rely on packet sequence number mechanism, ACK sequence number mechanism, retransmission mechanism, etc. to ensure the reliability of data transmission; it can use bandwidth estimation and congestion control methods to effectively prevent link congestion. The use of UDT protocol can reduce the time of sending computing power information, ensure the accuracy of computing power information, and reduce the probability of sticky packets.

Specifically, the computing power information includes resource information and request information; step S21 includes S211-S212.

S211, the computing power node sends resource information to the switch using L4 network protocol.

The computing power node can periodically or when the resource status changes, send resource information to one of the connected switches through the gateway within that autonomous domain using L4 network protocol. The resource information includes the type of service, the type and usage of computing and storage resources, and the NIC performance status and usage, and the switch uploads the resource information to the SDN sub-controller connected to it, and the SDN sub-controller uploads the received resource information to the SDN master controller.

S212, the access terminal sends request information to the switch using L4 network protocol.

When an access terminal wants to request computing power resources, it can use L4 network protocol to send request information to one of the connected switches through the gateway within that autonomous domain. The request information includes the type of service, the type and number of computing and storage resources needed, and the performance of the required NIC. This switch uploads the request information to the SDN sub-controller connected to it, and the SDN sub-controller uploads the received request information to the SDN master controller.

S22, the switch uploads the computing power information to the distributed SDN sub-controller.

S23, distributed SDN subcontroller collects switch status information and network quality information from switches using in-band network telemetry.

Figure 3:
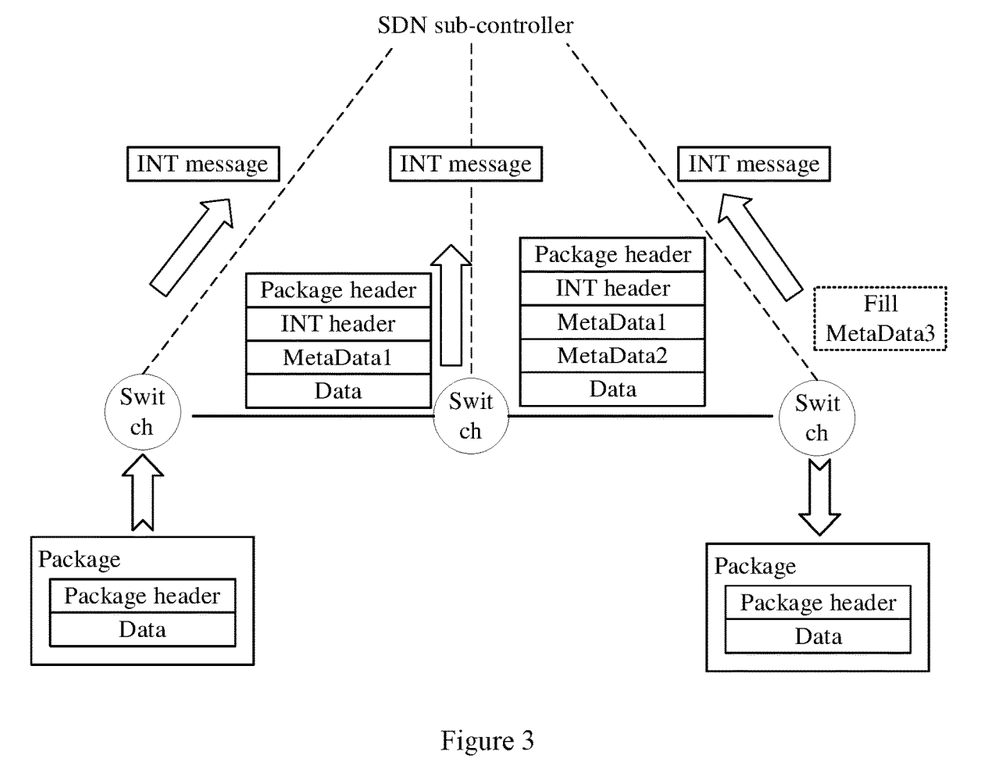
FIG. 3 is a schematic diagram of the in-band network telemetry process provided by the present invention.

Specifically, as shown in FIG. 3, an in-band network telemetry flowchart utilizes the programmability of the switch data plane to enable in-band network telemetry (INT) functionality. When a packet arrives at the first switch device node with the network telemetry function, the switch matches and parses the packet and mirrors different fields of the packet, such as the packet header and data, and inserts an INT header encapsulating the specified telemetry information at the appropriate location of the packet according to different network functions and protocols, and encapsulates the telemetry information data specified in the INT header generated by the switch into metadata. The telemetry information data specified in the INT header generated by the switch is encapsulated into metadata and inserted into the INT header. When the packets are forwarded to the intermediate switch nodes in turn, the switches match and resolve the INT header, and then insert the respective metadata in turn. When the packet is forwarded to the last hop switch, the switch inserts the metadata and then strips all telemetry data from the packet and encapsulates it into an INT message for uploading to the SDN sub-controller. The combination of hop-by-hop upload and end upload is adopted, that is, except for uploading telemetry data with the last hop switch, each hop switch will make a copy of the telemetry data obtained so far and encapsulate it into an INT message and upload it to the SDN sub-controller, which can first do simple record processing of these data, which is conducive to the immediate detection of abnormal conditions in the switch and the network, at the same time, packet loss may occur during the packet delivery process, and this can effectively prevent the loss of telemetry data. When the SDN sub-controller receives the last telemetry data from the switch, it will do detailed processing and analysis of the data and then upload it to the SDN master controller.

Optionally, the INT header and telemetry data can be inserted after the IP protocol header for Underlay networks and after the VXLAN protocol header or GRE protocol header for Overlay networks.

S24, The distributed SDN sub-controller uploads the computing power information, switch status information and network quality information to the SDN master controller.

S25, the SDN master controller determines the computing power scheduling policy based on computing power information, switch state information, network quality information, and the master controller information of the SDN master controller.

In the embodiment of the present invention, the computing power nodes and access terminals use L4 network protocol decoupled from BGP protocol to make directed announcements to the switch about the computing power information, which reduces the network fluctuation and topology resource consumption generated by BGP protocol announcements under the conditions of computing power information changes. Combined with the in-band network telemetry technology to collect switch status information and network quality information, it reduces the chance of network failure or congestion during the computing power scheduling process. The distributed SDN sub-controller receives the computing power information, switch status information and network quality information from the switches and sends them to the SDN master controller, which formulates the computing power scheduling policy based on the computing power information, switch status information, network quality information and its own master controller information, effectively improving the computing power scheduling efficiency.

According to the computing power scheduling method provided by the present invention, step S25 includes S251-S253.

S251, the SDN master controller determines alternative computing power nodes among the computing power nodes based on the resource information and request information.

S252, the SDN master controller determines the alternative optimal routing path for the access terminal to access the alternative computing power node based on the switch state information, network quality information, and the master controller information of the SDN master controller.

S253, the SDN host controller determines the target routing path of the access terminal to access the target computing power node among the alternative optimal routing paths of the access terminal to access the alternative computing power nodes according to the predefined rules.

Specifically, the SDN master controller first compares the request information of the access terminal with the resource information of each computing power node and selects several alternative computing power nodes that can meet the demand of the access terminal. Subsequently, for each alternative computing power node that satisfies the demand, alternative optimal routing paths from the access terminal to the alternative computing power node are separately identified.

Optionally, the switch status information includes port utilization and port processing rate, and the network quality information includes packet loss rate and packet queue length. Step S252 may include S2521-S2523.

S2521, the SDN host controller determines the first alternative routing path for the access terminal to access the alternative computing power node based on the network topology information.

S2522, the SDN host controller filters the first alternative routing path based on the network link information and determines the second alternative routing path.

S2523, the SDN host controller filters the second alternative routing path based on port utilization, port processing rate, packet loss rate, and packet queue length to determine the alternative optimal routing path.

Specifically, the alternative optimal routing path determination method can be divided into three steps. First, according to the bearer network topology information that the SDN main controller has, the method conducts depth-first search and traverses all feasible routing paths from the access terminal to the alternative arithmetic node, i.e., the first alternative routing path; second, according to the bearer network link information that the SDN main controller has, including the bearer network bandwidth information and traffic rate information, the method sets the weight value for each link, and the weight value. The larger the weight value, the better the network quality of the link, the link with the lowest weight value on the routing path becomes the short board of the whole path, and the routing path in which the sum of link weights in the first alternative routing path is greater than the preset value is taken as the second alternative path; third, according to the switch state information and network quality information of the bearer network that the SDN main controller has, the method avoids port utilization in the routing path that is higher than the preset value, port processing rate is lower than the preset value, the packet queue length is longer than the preset value, and the packet loss rate is higher than the preset value, and then an alternative optimal routing path from the access terminal to the alternative computing node is selected from the second alternative path.

After finding the alternative optimal routing paths from the access terminal to each alternative computing power node, the alternative optimal routing path whose sum of link weights is greater than a predetermined value is determined among these alternative optimal routing paths as the target routing path, and its corresponding alternative computing power node is used as the target computing power node of the access terminal. If there are multiple alternative optimal routing paths greater than a predetermined value, and the difference in the sum of the link weights between the alternative optimal routing paths is greater than a predetermined value, the alternative optimal routing path with the largest sum of link weights and its corresponding computing power node is selected as the target computing power node of the access terminal. If there are multiple alternative optimal routing paths greater than a predetermined value, and the difference between the alternative optimal routing paths is less than a predetermined value, then combining the computing power node resource information and the access terminal request information, the computing power node that makes the load between the computing power nodes more balanced after deploying the access terminal service request is selected as the target computing power node of the access terminal, and its corresponding alternative optimal routing path is the target routing path from the access terminal to the target computing power node.

In the embodiment of the present invention, the SDN master controller determines an alternative computing power node among the computing power nodes based on the resource information and request information; determines an alternative optimal routing path for the access terminal to access the alternative computing power node based on the switch state information, the network quality information, and the master controller information; and determines the target routing path of access terminal accessing the target computing power node, among the alternative optimal routing paths of the access terminal accessing the alternative computing power nodes, according to the predefined rules. The efficient computing power scheduling is achieved by quickly and accurately determining the target computing power node with high efficiency between the access terminal and the computing power node and the target routing path with high efficiency in the access terminal accessing the target computing power node.

According to the computing power scheduling method provided by the present invention, step S22 is followed by steps S221-S223.

S221, the distributed SDN sub-controller determines the switch load according to the computing power information at the first moment and sends the switch load to the SDN master controller.

S222, the SDN master controller determines the control time of the first SDN subcontroller and the second SDN subcontroller for the switch based on the switch load.

S223, the switch sends the second moment of computing power information to the first SDN subcontroller and the second SDN subcontroller in segments according to the control time.

Figure 4:
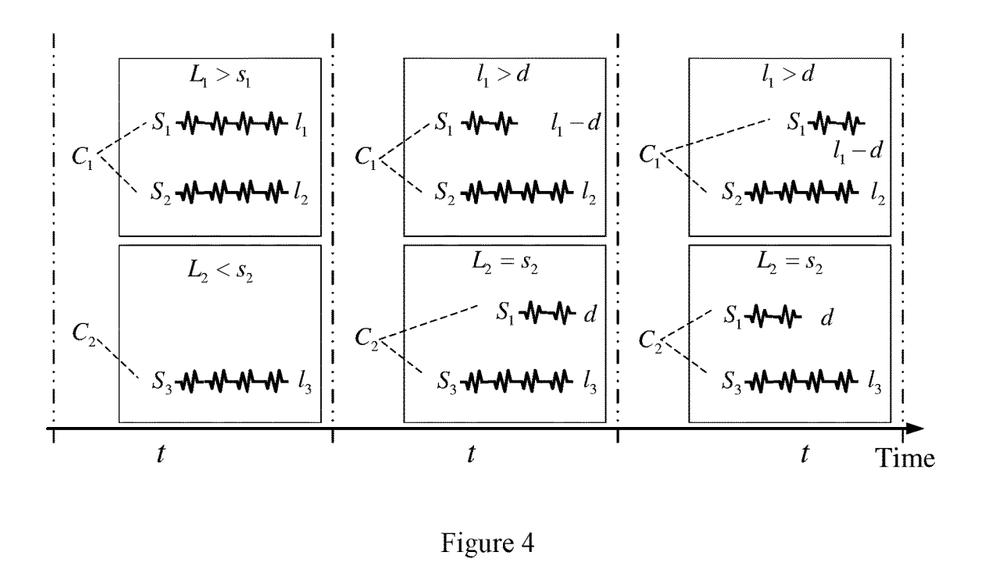
FIG. 4 is a schematic diagram of the switch migration process provided by the present invention.

Specifically, switch migration can be achieved by sequentially sharing the load of the same switch between two SDN subcontrollers during the time period, and calculating the time that each subcontroller controls the switch during the time period based on the amount of load that the switch generates on the subcontroller during the time period. This prevents the ping-pong effect from occurring, i.e., if a subcontroller with a surplus of load completely takes over a portion of the switch controlled by an overloaded subcontroller for the entire time period, it is very likely to overload itself, and then migrate the portion of the switch back to the atomic controller, which is once again overloaded, and so on.

As shown in FIG. 4, two SDN sub-controllers and three switches are taken as an example. The two SDN sub-controllers are denoted by $C_1$ and $C_2$ respectively, and the three switches are denoted by $S_1$, $S_2$ and $S_3$ respectively, $C_1$ controls $S_1$ and $S_2$, and $C_2$ controls $S_3$. Assuming that the maximum loads of $C_1$ and $C_2$ in the time period t are $s_1$ and $s_2$ respectively, and the loads generated by $S_1$, $S_2$ and $S_3$ on the controllers in the time period t are $l_1$, $l_2$ and $l_3$ respectively, then in the time period t the total load of $C_1$ is $L_1=l_1+l_2$, and the total load of $C_2$ is $L_2=l_3$. If $L_1>s_1$, $L_2<s_2$, then part of the load of $C_1$ can be transferred to $C_2$. Let the load margin of $C_2$ be $d=d=s_2-L_2$, and the switch with the closest load to d is selected among the switches controlled by $C_1$ for migration. Here, it is assumed that $|l_1-d|<|l_2-d|$, then switch $S_1$ will be migrated. If $l_1 \le d$, then $S_1$ can be completely controlled by $C_2$ within t time period. If $l_1 > d$, the time period for $C_2$ to control $S_1$ is calculated as $(d \times t)/l_1$, that is, after implementing the switch migration strategy, $S_1$ does not immediately migrate, but is first controlled by $C_1$ for $t-(d \times t)/l_1$ time period, and then migrates to $C_2$ controlled by it $(d \times t)/l_1$ time period. In the next t time period, $S_1$ continues to be controlled by $C_2$ for $(d \times t)/l_1$ time period, and then migrates to $C_1$ to be controlled by it for $t-(d \times t)/l_1$ time period, and so on. If $C_1$ is still in the overload state, then other SDN sub-controllers with load margin to execute the above switch migration process is selected.

In the embodiment of the present invention, the switch determines the load amount based on the computing power information, determines the control time of the first SDN sub-controller and the second SDN sub-controller based on the load amount, sends the computing power information to the first SDN sub-controller and the second SDN sub-controller in segments based on the control time, realizes switch migration, and then realizes load balancing among SDN sub-controllers, reduces the overload of SDN sub-controllers and improves the efficiency of computing power scheduling.

The computing power scheduling apparatus provided by the present invention is described below, and the computing power scheduling apparatus described below and the computing power scheduling method described above may be cross-referenced.

Figure 5:
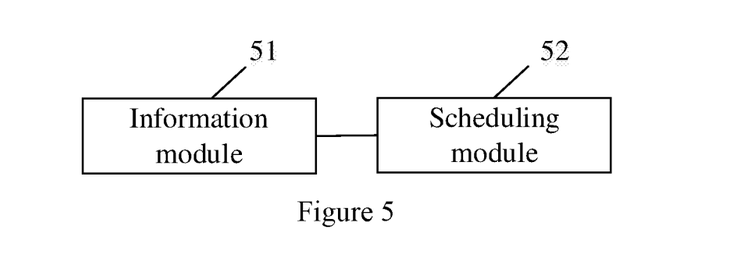
FIG. 5 is a schematic diagram of the structure of the computing power scheduling device provided by the present invention.

The present invention also provides a computing power scheduling apparatus, as shown in FIG. 5, including:

information module 51 for controlling the computing power nodes and access terminals to send computing power information to the switch using L4 network protocol; wherein L4 network protocol is based on UDP protocol and decoupled from BGP protocol; controlling the switch to upload the computing power information to the distributed SDN sub-controller; controlling the distributed SDN sub-controller to collect switch status information and network quality information from the switch using in-band network telemetry information, and uploading computing power information, switch state information and network quality information to the SDN master controller;

scheduling module 52 for controlling the SDN master controller to determine the computing power scheduling policy based on the computing power information, switch state information, network quality information, and master controller information of the SDN master controller.

In the embodiment of the present invention, the computing power nodes and access terminals use L4 network protocol decoupled from BGP protocol to make directed announcements to the switch about the computing power information, which reduces the network fluctuation and topology resource consumption generated by BGP protocol announcements under the conditions of computing power information changes. Combined with the in-band network telemetry technology to collect switch status information and network quality information, it reduces the chance of network failure or congestion during the computing power scheduling process. The distributed SDN sub-controller receives the computing power information, switch status information and network quality information from the switches and sends them to the SDN master controller, which formulates the computing power scheduling policy based on the computing power information, switch status information, network quality information and its own master controller information, effectively improving the computing power scheduling efficiency.

Providing computing power scheduling apparatus according to the present invention, the computing power information includes resource information and request information;

Information module 51 is specifically for controlling the computing power node to send resource information to the switch using L4 network protocol; and controlling the access terminal to send request information to the switch using L4 network protocol.

According to the present invention, the computing power scheduling device is provided, and the scheduling module 52 is specifically used to control the SDN master controller to determine an alternative computing power node among the computing power nodes based on the resource information and the request information; to control the SDN master controller to determine an alternative optimal routing path for the access terminal to access the alternative computing power node based on the switch state information, the network quality information, and the master controller information of the SDN master controller; the SDN master controller determines the target routing path of the access terminal to the target computing power node among the alternative optimal routing paths of the access terminal to the alternative computing power nodes according to the preset rules.

Providing computing power scheduling apparatus according to the present invention, the main controller information include network topology information and network link information;

Switch status information includes port utilization and port processing rate; network quality information includes packet loss rate and packet queue length.

According to the present invention, the computing power apparatus device is provided, and the scheduling module 52 is specifically used to control the SDN master controller to determine the first alternative routing path for the access terminal to access the alternative arithmetic node based on the network topology information; to control the SDN master controller to filter the first alternative routing path to determine the second alternative routing path based on the network link information; and to control the SDN master controller to filter the second alternative routing path to determine the alternative optimal routing path based on the port utilization, port processing rate, packet loss rate and packet queue length.

According to the present invention, the computing power apparatus device is provided, and the scheduling module 52 is further used to control the distributed SDN sub-controller to determine the switch load based on the computing power information at the first moment and send the switch load to the SDN master controller; to control the SDN master controller to determine the control time of the first SDN sub-controller and the second SDN sub-controller for the switch based on the switch load; to control the switch to send the switch to the first SDN sub-controller and the second SDN sub-controller based on the control time; to control the switch sends the second moment of computing power information to the first SDN sub-controller and the second SDN sub-controller in segments based on the control time.

Figure 6:
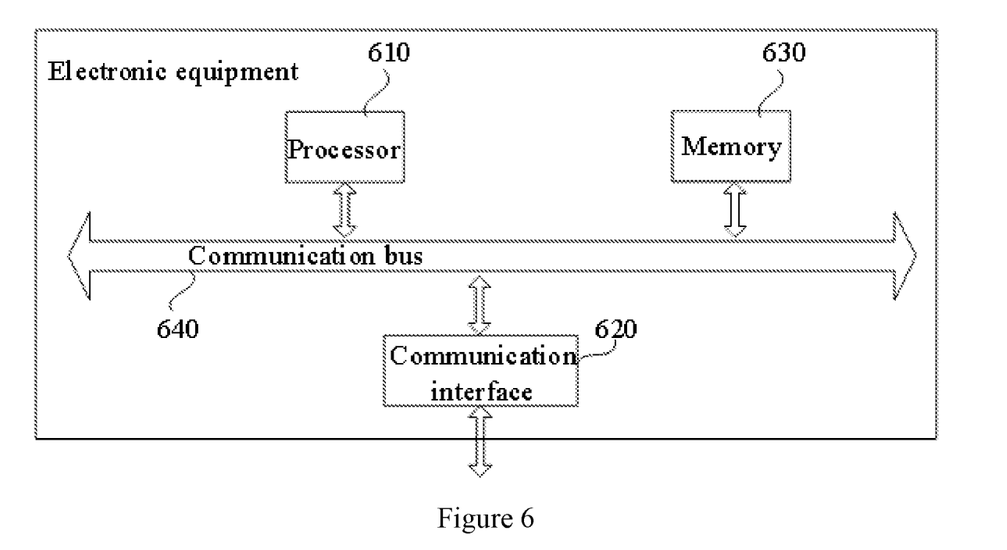
FIG. 6 is a schematic diagram of the structure of the electronic device provided by the present invention.

FIG. 6 exemplifies a schematic diagram of a physical structure of an electronic device that may include a processor 610, a communications interface 620, a memory 630, and a communications bus 640, wherein the processor 610, the communications interface 620, the memory 630 complete communication with each other through the communication bus 640. The processor 610 may invoke logical instructions in the memory 630 to execute a computing power scheduling method that includes: a computing power node and an access terminal sending computing power information to the switch using L4 network protocol; wherein L4 network protocol is based on UDP protocol and decoupled from BGP protocol; the switch uploads the computing power information to a distributed SDN sub-controller; the distributed SDN sub-controller collects switch state information and network quality information from the switch using in-band network telemetry; the distributed SDN sub-controller uploads computing power information, switch state information and network quality information to the SDN master controller; the SDN master controller determines the computing power scheduling policy based on computing power information, switch state information, network quality information and the master controller information of the SDN master controller.

In addition, the logical instructions in the memory 630 described above may be stored in a computer readable storage medium when implemented in the form of a software functional unit and sold or used as a separate product. Based on this understanding, the technical solution of the present invention, or the part of the technical solution that essentially contributes to the prior art, may be embodied in the form of a software product, which is stored in a storage medium and includes a number of instructions to enable a computer device (which may be a personal computer, a server, or a network device, etc.) to perform all or part of the steps of the method of each embodiment of the present invention. All or some of the steps of the method of each embodiment of the invention. The aforementioned storage media include: USB flash drive, removable hard disk, Read-Only Memory (ROM), Random Access Memory (RAM), disk or CD-ROM, and other media that can store program code.

On the other hand, the present invention further provides a computer program product, the computer program product includes a computer program, the computer program being storable on a non-transitory computer readable storage medium, the computer program being executable by a processor, the computer being capable of executing the computing power scheduling method provided by each of the above methods, the method includes: the computing power node and the access terminal sending computing power information to the switch using L4 network protocol; the wherein L4 network protocol is based on UDP protocol and decoupled from BGP protocol; the switch uploads the computing power information to the distributed SDN sub-controller; the distributed SDN subcontroller collects switch state information and network quality information of the switch using in-band network telemetry; the distributed SDN subcontroller uploads the computing power information, the switch state information and the network quality information to the SDN master controller; the SDN master controller determines the computing power scheduling policy based on the computing power power information, switch status information, network quality information and the master controller information of the SDN master controller.

In yet another aspect, the present invention further provides a non-transitory computer readable storage medium having a computer program stored thereon, the computer program being implemented to perform the computing power scheduling method provided by each of the above methods when executed by a processor, the method includes: a computing power node and an access terminal sending computing power information to a switch using L4 network protocol; wherein L4 network protocol is based on UDP protocol and decoupled from BGP protocol; the switch uploads the computing power information to the distributed SDN subcontroller; the distributed SDN subcontroller collects switch state information and network quality information from the switch using in-band network telemetry; the distributed SDN subcontroller uploads the computing power information, switch state information, and network quality information to the SDN master controller; the SDN master controller collects the computing power information, switch state information, network quality information, and network quality information based on the computing power information, switch state information, network quality; the SDN master controller determines the computing power scheduling policy based on the computing power information, switch state information, network quality information and the master controller information of the SDN master controller.

The embodiments of the device described above are merely schematic, wherein the units illustrated as separate components may or may not be physically separated, and the components displayed as units may or may not be physical units, i.e., they may be located in one place or may be distributed to multiple network units. Some or all of these modules can be selected according to practical needs to achieve the purpose of this embodiment solution. It can be understood and implemented by a person of ordinary skill in the art without creative labor.

From the above description of the implementations, it is clear to those skilled in the art that the respective implementations can be implemented with the help of software plus the necessary common hardware platform, and of course, hardware. Based on this understanding, the above technical solutions may be embodied in the form of a software product that can be stored in a computer readable storage medium, such as ROM/RAM, disk, CD-ROM, etc., including a number of instructions to enable a computer device (which may be a personal computer, server, or network device, etc.) to execute each embodiment or some part of an embodiment.

Finally, it should be noted that the above embodiments are only used to illustrate the technical solution of the present invention, not to limit it; despite the detailed description of the present invention with reference to the foregoing embodiments, it should be understood by a person of ordinary skill in the art that it is still possible to modify the technical solution recorded in the foregoing embodiments, or to make equivalent substitution of some technical features thereof; and these modifications or substitutions do not make the essence of the corresponding technical solution out of the spirit and scope of the technical solution of the embodiments of the present invention.

What is claimed is:

1. A method for scheduling computing power power is characterized in that it includes:
the computing power nodes and access terminals send computing power information to the switch using L4 network protocol; where L4 network protocol is based on the UDP protocol and decoupled from the BGP protocol;
the switch uploads computing power information to the distributed SDN sub-controller;
distributed SDN subcontrollers collect switch status information and network quality information from switches using in-band network telemetry;
distributed SDN sub-controller uploads computing power information, switch status information and network quality information to the SDN master controller;
the SDN master controller determines the computing power scheduling policy based on computing power information, switch state information, network quality information and the master controller information of the SDN master controller;
computing power information includes resource information and request information;
the computing power node and the access terminal send computing power information to the switch directionally using L4 network protocol, including: the computing power node sends resource information to the switch using L4 network protocol;
the access terminal sends request information to the switch using L4 network protocol;
the SDN master controller determines a computing power scheduling strategy based on computing power information, switch state information, network quality information and the master controller information of the SDN master controller, including: the SDN master controller determines an alternative computing power node among the computing power nodes based on resource information and request information; the SDN master controller determines an alternative computing power node among the alternative computing power nodes based on switch state information, network quality information and the master controller information of the SDN master controller, determining an alternative optimal routing path for the access terminal to access the alternative computing power node; the SDN master controller determines a target routing path for the access terminal to access the target computing power node among the alternative optimal routing paths for the access terminal to access the alternative computing power node according to predetermined rules;
master controller information includes network topology information and network link information;
switch status information includes port utilization and port processing rate;
network quality information includes packet loss rate and packet queue length;
SDN master controller determines alternative optimal routing paths for access terminal access to alternative computing power nodes based on switch status information, network quality information and master controller information of SDN master controller, including: SDN master controller determines first alternative routing path for access terminal access to alternative computing power nodes based on network topology information; SDN master controller determines first alternative routing path based on network link information; SDN master controller determines second alternative routing path based on network link information path screening to determine a second alternative routing path; the SDN master controller screens the second alternative routing path to determine an alternative optimal routing path based on port utilization, port processing rate, packet loss rate, and packet queue length;
after the switch uploads the computing power information to the connected distributed SDN subcontroller, further including: the distributed SDN subcontroller determines the switch load based on the computing power information at the first moment and sends the switch load to the SDN master controller; the SDN master controller determines the control time of the switch by the first SDN subcontroller and the second SDN subcontroller based on the switch load; the switch sends the computing power information of the second moment to the first SDN sub-controller and the second SDN sub-controller in segments according to the control time.

2. A computing power scheduling apparatus is characterized in that it includes:
information module for controlling computing power nodes and access terminals to send computing power information to the switch using L4 network protocol; wherein L4 network protocol is based on UDP protocol and decoupled from BGP protocol; controlling the switch to upload computing power information to the distributed SDN sub-controller; controlling the distributed SDN sub-controller to collect switch status information and network quality information from the switch using in-band network telemetry techniques, and uploading computing power power information, switch state information and network quality information to the SDN master controller;
a scheduling module for controlling the SDN master controller to determine a computing power scheduling policy based on computing power information, switch state information, network quality information, and master controller information of the SDN master controller;
information module, specifically for controlling the computing power node to send resource information to the switch using L4 network protocol; controlling the access terminal to send request information to the switch using L4 network protocol;
scheduling module, specifically for controlling the SDN master controller to determine an alternative computing power node among the computing power nodes based on the resource information and the request information; controlling the SDN master controller to determine an alternative optimal routing path for the access terminal to access the alternative computing power node based on the switch state information, the network quality information, and the master controller information of the SDN master controller; the SDN master controller to determine, based on the predetermined rules, among the alternative optimal routing paths for the access terminal to access the alternative computing power node among the alternative optimal routing paths for accessing the alternative computing power nodes, the SDN master controller to determine the target routing path for accessing the access terminal to the target computing power node according to the preset rules;

scheduling module, specifically for controlling the SDN master controller to determine a first alternative routing path for the access terminal to access the alternative arithmetic node based on the network topology information; controlling the SDN master controller to determine a second alternative routing path by filtering the first alternative routing path based on the network link information; controlling the SDN master controller to determine a second alternative routing path based on port utilization, port processing rate, packet loss rate, and packet queue length second alternative routing paths based on port utilization, port processing rate, packet loss rate and packet queue length, and determine the alternative optimal routing paths;

scheduling module, further for controlling the distributed SDN subcontroller to determine the switch load based on the first moment of computing power information and send the switch load to the SDN master controller; controlling the SDN master controller to determine the control time of the first SDN subcontroller and the second SDN subcontroller for the switch based on the switch load; and controlling the switch to segment the second moment of computing power information based on the control time to the first SDN sub-controller and the second SDN sub-controller based on the control time.

3. An electronic device including a memory, a processor and a computer program stored in the memory and runnable on the processor is characterized in that the processor executes the program implementing the steps of the computing power scheduling method as in claim 1.

4. A non-transitory computer readable storage medium having a computer program stored thereon is characterized in that the computer program implements the steps of the computing power scheduling method as in claim 1 when executed by a processor.

* * * * *